United States Patent [19]

Lemke

[11] Patent Number: 5,402,956
[45] Date of Patent: Apr. 4, 1995

[54] TWO OR THREE CAPSTAN TAPE DRIVE

[76] Inventor: James U. Lemke, 2400 6th Ave. #1103, San Diego, Calif. 92101

[21] Appl. No.: 907,063

[22] Filed: Jul. 1, 1992

[51] Int. Cl.$^6$ ............................................ G11B 15/28
[52] U.S. Cl. .................... 242/352.2; 226/44; 226/111
[58] Field of Search ............. 242/182, 183, 184, 185, 242/186, 189, 352.2; 226/24, 31, 42, 44, 111

[56] References Cited

U.S. PATENT DOCUMENTS

| | | | |
|---|---|---|---|
| 3,122,332 | 2/1964 | Hughes, Jr. | 242/184 |
| 3,216,637 | 11/1965 | Cholet | 226/111 X |
| 3,291,410 | 12/1966 | Berryman | 242/183 |
| 3,294,331 | 12/1966 | Wang et al. | 226/24 X |
| 3,329,364 | 7/1967 | Brettell | 242/182 |
| 3,405,857 | 10/1968 | Albrecht | 242/186 |
| 3,471,103 | 10/1969 | Gabor | 242/184 |
| 3,563,492 | 2/1971 | Ferrier, Jr. | 226/42 X |
| 3,648,134 | 3/1972 | Audeh et al. | 242/184 X |
| 3,666,201 | 5/1972 | Stahler | 242/180 |
| 3,713,606 | 1/1973 | Van Pelt et al. | 226/42 X |
| 3,729,149 | 4/1973 | Vande Wijngavert | 242/183 |
| 3,866,855 | 2/1975 | Bryer | 242/184 |
| 3,890,547 | 6/1975 | Keck | 226/42 X |
| 3,898,693 | 8/1975 | Chang | 242/183 X |
| 4,104,685 | 8/1978 | Chang | 242/189 X |

OTHER PUBLICATIONS

"Magnetic Recording Handbook", Editors: Mee & Daniel, McGraw Hill Pub. Co., 1990; pp. 1107–1112.

Primary Examiner—Daniel P. Stodola
Assistant Examiner—John P. Darling

[57] ABSTRACT

In a capstan driven tape transport, placing the tape into a "zero" tension condition before it engages the first of two tape speed metering capstans of the transport. "Zero" tape tension is a negligible tension relative to the tape tensions normally present in the drive, and substantially approaches a value of zero tension. "Zero" tape tension is attained by the tape passing from the tape supply over an auxiliary capstan located upstream from the first tape speed metering capstan, and the tape segment emerging from the auxiliary capstan is configured to hang in a very loose loop. The loop is maintained at "zero" tension by sensing the loop position either by a slight pressure differential in a vacuum column or by a very light arm resting on the loop, and the sense signal is used to servo the speed of the auxiliary capstan to maintain "zero" tension in the loop. The zero tension tape segment sequentially engages the first of two speed metering capstans, the recorder's record/playback heads and then a second tape speed metering capstan before being wound onto a takeup spool. The invention is applicable to a linear tape motion transport or to a helical scan transport, and in a less sophisticated version is applicable to a simplified two capstan helical scan transport.

18 Claims, 3 Drawing Sheets

TWO OR THREE CAPSTAN TAPE DRIVE

BACKGROUND OF THE INVENTION

1. Field of the Invention

This invention relates to a magnetic tape drive, and in particular to a tape drive utilizing multiple capstans.

2. Description Relative to the Prior Art

A critical component in a magnetic tape recorder/reproducer system is the tape transport mechanism. The reproduced quality and fidelity of a previously recorded signal is highly dependent upon the uniformity of tape movement relative to the recorder heads both during record and playback, and this uniformity is primarily determined by the tape drive characteristics. The use of a metering capstan to provide uniform tape speed during recording and playback has been long known in the art, and many capstan configurations have been implemented in the search for the ideal uniform speed tape drive. This ideal capstan driven tape transport has not been attained; one reason is the perturbations in the tension experienced by the tape as it is transported from a supply reel past the heads to a take up reel, which results in dynamic tape stretch with attendant speed fluctuations of the tape across the heads. These perturbations in the tension arise from fluctuations in the supply reel rotational speed, scrape induced tension variations due to rubbing of the tape edges by the supply reel flanges, and frictional effects of heads, guides and rollers located in the tape path.

The propagation of these tension variations through a capstan metered tape drive system has been analyzed in the prior art. In the treatise "Magnetic Recording Handbook", editors C. Denis Mee, Eric D. Daniel, 1990, McGraw-Hill Publishing Company, New York, pp.1107–1112 (J. U. Lemke), it is shown that in a single capstan transport or, in a dual capstan transport wherein the tape velocity is the same at both capstans, tension perturbations present in the output of the tape supply which feeds the capstan assemblies propagate into the head region without attenuation.

In the dual capstan transport having a differential in tape speed between the two capstans, a design value of the tension in the span of tape between the capstans may be set by selection of the speed differential. Generally, this tension must be maintained at a low value to minimize stretch of typically used thin based tape, and under this constraint the supply side tension and its variations also propagate into the tape segment at the heads.

The above results are derived in the referenced analysis, and may be further understood in connection with FIG. 1. A tape supply 10 feeds a tape 12 to a capstan assembly comprising a first capstan 14 and associated pinch roller 16 downstream from the tape supply 10, and then onto a further downstream capstan assembly comprising a second capstan 18 and associated pinch roller 20, after which the tape 12 is spooled onto a takeup reel 22. ("Downstream" means along the tape path in the direction of tape travel, while "upstream" is the direction along the tape path opposite to the direction of tape travel.) Various equivalent means of maintaining contact between the tape and capstan other than by use of a pinch roller are well known in the art. For example, the tape may be driven by frictional forces generated by engaging the tape over a large wrap angle around a capstan having a surface with a high coefficient of friction. Before the tape 12 engages the first capstan 14 it has a velocity $v_1$, and tension $T_1$, and upon the tape 12 engaging the second capstan 18 the tape segment 24 has a velocity $v_2$, and tension $T_2$. The rotational speed or the diameter of the capstan 18 is configured so that the peripheral velocity at the capstan 18 surface is $v_2 = (1+\delta)v_1$. In the analysis referenced above, and ignoring tension loss at the heads, it is shown that the tension $T_2$ is given by the relation:

$$T_2 = (\delta/\beta) + (1+\delta)T_1$$

where $(1+\delta) = v_2/v_1$ and $\beta$ is the strain modulus of the tape, equal to $\Delta l/lT$, where $l$ is the tape length and $T$ is the tension.

In a two capstan drive where both capstans impart the same velocity to the tape, or in an equivalent single capstan closed-loop drive, the velocity differential is 0, i.e. in the above relation $\delta = 0$, and $T_2 = T_1$. Resultingly, the supply side tape tension and its variations propagate into the tape segment 24 where the heads 26,28 are located.

In the case of the dual capstan differential speed transport, $\delta$ and $\beta$ are selected so that $$(\delta/\beta) >> (1+\delta)T_1$$

and from the above equation, the tension $T_2$ is effectively set by the dominant term $(\delta/\beta)$, with the term $(1+\delta)T_1$ contributing perturbations in the tension $T_2$ which arise from variations in $T_1$. The above results may also be applied to the helical scan drive. The helical scan drive is well known in the video recording art, and it has also been applied in recording large quantities of digital data at high transfer rates. Thin based tape is used to efficiently store the large volume of recorded digital data involved, and this mandates very low tape tensions to obviate tape stretch. Referring to FIG. 2, in a dual capstan helical scan drive, tape 30 feeds from a supply reel 32 through a first capstan 34 and associated pinch roller 36, past guides 38,40 onto the surface of the helical scan drum 42, which it wraps with an angle of $\pi$ radians. The tape 30 upon leaving the drum 42 passes over guides 44,46 to a second capstan 48 and associated pinch roller 50, and then onto a takeup spool 52. From the previous analysis, it will be appreciated that any tension variations originating on the supply side of the transport, i.e. the supply 32, immediately propagates through the capstan 34 and appears unattenuated as $T_{in}$, at the point where the tape 30 engages the drum 42. Typically the drum 42 consists of a lower fixed drum, and a rotating upper drum with the scanner head wheel rotating between the upper and lower drums. As the tape 30 slides across the fixed lower drum of the scan drum 42 the tension rises in the tape 30 due to the friction between the tape and the fixed drum. After leaving the drum 42 the tape tension $T_{out}$ is determined by the formula $T_{out} = T_{in}e^{\mu\theta}$ (commonly known as the "brake band" equation) where $\mu$ is the coefficient of friction between the fixed drum and the tape and $\theta$ is the wrap angle, equal to $\pi$ radians for the typical helical scan drive. The coefficient of friction $\mu$ ranges in value from 0.001 to 0.3, and is strongly dependent upon humidity, temperature, and the condition of the drum and tape surfaces. Therefore, the tension $T_{out}$, and concurrently as shown in FIG. 3, the total tape stretch resulting from $T_{out}$, $$\int_0^\pi \Delta l(\theta) d\theta$$

can have the widely differing values, e.g. 54 or 56, at a wrap angle of $\pi$ radians for two different coefficients of friction $\mu_1, \mu_2$. The resultant tape stretch causes a serious problem in the recording and playback of the digital data. A track may be recorded under conditions of temperature and humidity that result in the coefficient of friction $\mu_1$, while differing conditions during playback may give rise to the coefficient of friction $\mu_2$. As previously noted, this causes a differential in tape stretch, and FIG. 4 shows the displacement 60 of a data track during playback due to tape stretch relative to its position 58 during recording. As the head scans the path over the track having displacement 60, it intercepts lesser and lesser amounts of the flux from the track position 58 as recorded. Therefore the envelope of the reproduced signal diminishes during the playback scan, and the available signal to noise deteriorates. This reduced SNR necessitates reduced recording density in order to maintain acceptable accuracy of the reproduced data.

SUMMARY OF THE INVENTION

In a capstan driven tape transport, the present invention teaches placing the tape into a "zero" tension condition before it engages the first tape speed metering capstan of the transport. "Zero" tape tension is a negligible tension relative to the tape tensions normally present in the drive, and substantially approaches a value of zero tension. "Zero" tape tension is attained by means of the tape passing from the tape supply over an auxiliary capstan assembly located upstream from the first tape speed metering capstan, and the tape segment emerging from the auxiliary capstan assembly is configured to hang in a very loose loop bending typically at, or near, the natural radius of curvature of the tape. The loop is maintained at "zero" tension by sensing the loop position either by means of a slight pressure differential in a vacuum column or by means of a very light arm resting on the loop, and the sense signal is used to servo the speed of the auxiliary capstan assembly to maintain "zero" tension in the loop. The "zero" tension condition of the tape as it engages the first metering capstan assembly of the transport insures that neither the tension in the tape as it emerges from the tape supply, nor variations of this tension are reflected into the critical region of the tape path where the record and/or playback heads contact the tape.

In a dual capstan differential speed transport, by practice of the invention the tension in the tape as it passes over the heads may be set and maintained at a controlled low value by selection of the capstans' speed differential. This obviates tape stretch, and provides tape movement over the heads that is free from perturbations arising in the both the tape supply and tape takeup.

By making $(1+\epsilon)T_1$ negligibly small, the term $(\delta/\beta)$ may also be small resulting in very low tension in the region of interest, i.e. at the heads or scanner drum.

It is an intention of the invention to achieve very low tensions around a scanning drum. Accordingly, it may be desirable to increase the wrap angle around the drum to an angle greater than that demanded by the geometry of the recorder in order to ensure that the tape adequately contacts the drum at the initiation and end of scan, e.g. in a 180 degree wrap recorder the angle may be somewhat larger, for instance 1.1 $\pi$ radians.

The dual capstan differential speed configuration is applicable both to the linear tape motion transport and to the helical scan transport, and the teachings of the inventions are applied to both types of transports in the embodiments described below.

BRIEF DESCRIPTION OF THE DRAWINGS

The prior art and the invention will be described with respect to the drawings, of which.

DESCRIPTION OF PREFERRED EMBODIMENTS

Figure 1:
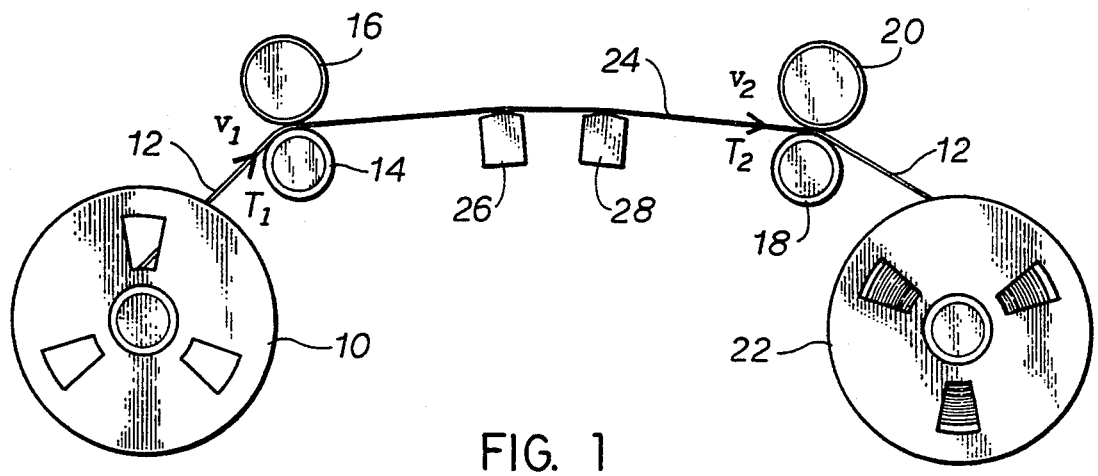
FIG. 1 schematically illustrates a longitudinal magnetic recorder of the prior art.
Figure 2:
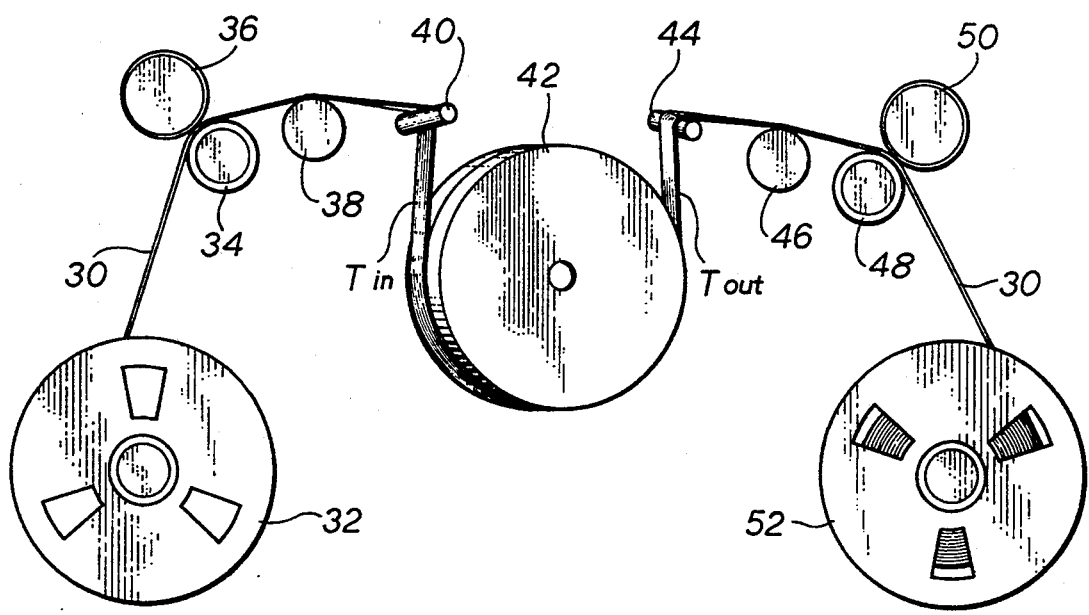
FIG. 2 schematically illustrates a helical scan recorder of the prior art.
Figure 3:
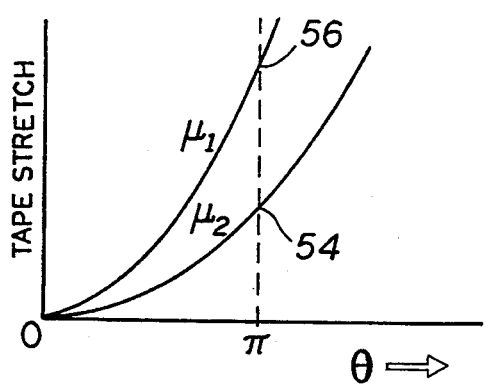
FIG. 3 is a graph illustrating a problem occurring in magnetic recorders of the prior art.
Figure 4:
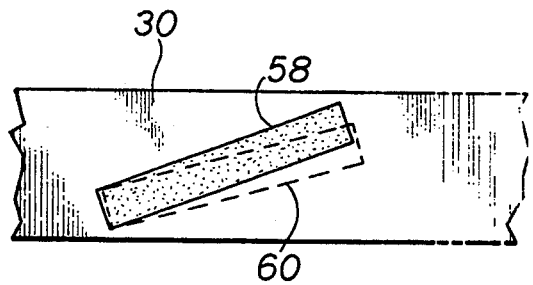
FIG. 4 is a drawing showing the distortion of a recorded track of a helical scan recorder of the prior art.
Figure 5:
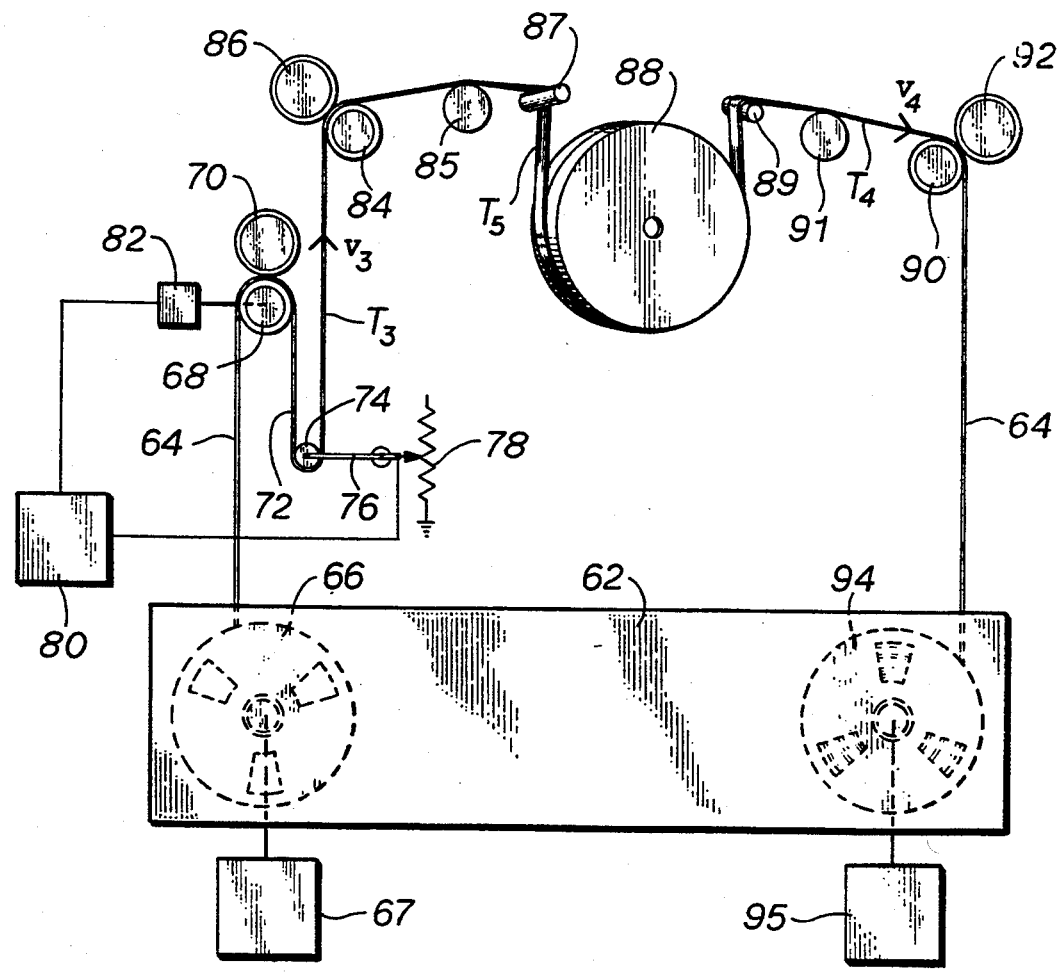
FIG. 5 is a schematic drawing of a helical scan recorder incorporating a three capstan embodiment of the present invention.

In a preferred embodiment, the invention is utilized in a helical scan recorder for use in digital data recording. Referring to FIG. 5, a cassette 62 supplies tape 64 from a supply reel 66 to a capstan 68 and associated pinch roller 70, which pulls the tape 64 from the supply reel 66. The supply reel 66 is coupled to a supply motor 67 which provides holdback tension in the tape 64. The tape 64 exiting the capstan forms a loop 72 whose tension is determined by the position of a light weight roller 74 mounted on a pivoting arm 76. The loop 72 is maintained at essentially "zero" tension by the capstan 68 feeding tape 64 into the loop 72 in response to the motion of the roller 74 and arm 76. The deviation of the angular position of the arm 76 from its position for "zero" tape tension, generates an error signal by means of a frictionless position sensor 78, such as an optical sensor. The sensor 78 feeds a servo driver 80 which controls a motor 82 for driving the capstan 68 to feed tape so that the tension $T_3$, in the loop 72, remains near "zero". The loop 72 tends to assume the natural bending radius of the tape 72 as the arm 76 and roller or pin 74 exert negligible pressure on the loop 72. For a $\frac{1}{4}''$ wide, 0.5 mil thick base tape, the force exerted by the roller 74 and arm 76 on the tape of the loop 72 is on the order of 1 gram. In this specification, because a tension on the order of 1 gram is negligible relative to the other tensions experienced by the tape traversing the transport, such a tension is defined as zero tension.

The tape having the tension $T_3$ at the output of the loop 72 feeds a first tape speed metering capstan 84 and associated pinch roller 86. The tape passes over guides 85, 87 and then wraps a helical scan drum 88, where signal recording or playback occurs, and after passing over guides 89, 91 the tape engages a second tape speed metering capstan 90 and associated pinch roller 92. The tape 64 is next taken up on the cassette 62 take up reel 94, driven by a take up motor 95.

The capstan 90 is operated at a slightly higher peripheral speed than the capstan 84, so that the ratio of the tape speed $v_4$ of the tape engaging the capstan 90 to the tape speed $v_3$ of the tape engaging the capstan 84 is $(1+\delta)$. Applying the tension equation given above $$T_4 = (\delta/\beta) + (1+\delta)T_3$$

and it will be appreciated that because $T_3=0$, the tension $T_4$ has the value $$T_4 = (\delta/\beta)$$

that is, the tension $T_4$ is almost completely independent of the tape supply tension, and its variations, and that the tension $T_4$ may be controllably set by selection of the parameter $\delta$; $\beta$ being a property of the tape.

It is to be noted that the tension $T_4$ is also related to the tension $T_5$ in the tape 64 as it begins to wrap the drum 88 by the "brake band" equation $$T_4 = T_5 e^{\mu\theta}$$

or, solving for $T_5$, $$T_5 = T_4 e^{-\mu\theta}$$

and substituting $T_4$, $$T_5 = (\delta/\beta)e^{-\mu\theta}$$

This is a small controllable number indicating low tension at the input of the drum 88, and the average tension of the tape contacting the heads as the tape wraps the drum 88 may be set at a predetermined value by selection of $\delta/\beta$. As previously explained, tension perturbations in the tape 64 originating upstream from the capstan 68 do not propagate past the loop 72 through the drive. In addition, the tension and variations in the tension due to the take up reel 94 or take up motor 95 of the transport have no effect on $T_4$ or $T_5$ as they cannot propagate in the upstream direction past the capstan 90 and pinch roller 92.

Figure 6:
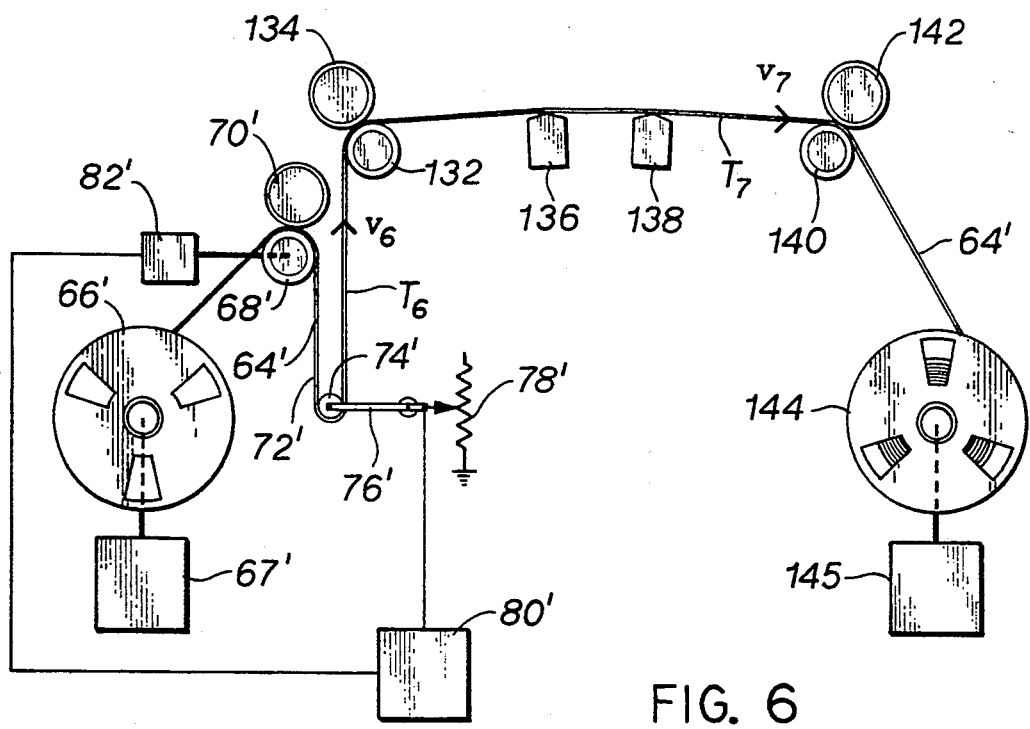
FIG. 6 is a schematic drawing of a longitudinal recorder incorporating a three capstan embodiment of the present invention.

A further embodiment is shown in FIG. 6, where the practice of the invention is applied to a fixed head, longitudinal tape motion transport utilizing dual differential tape speed metering capstans. The primed elements 64' through 82' of FIG. 6 correspond to the elements 64 through 82 of FIG. 5, and perform the same functions of the corresponding elements of FIG. 5 in establishing a tape loop 72' having zero tension. The tape loop 72' feeds a first tape speed metering capstan 132 and associated pinch roller 134. The span of tape 64' exiting the capstan 132 passes over fixed heads 136, 138 and then contacts a second speed metering capstan 140, 142. The tape 64' is then taken up by a take up spool 144 driven by a take up motor 145.

The capstans 132, 140 of the transport of FIG. 6 operate differentially resulting in tape speeds $v_7, v_6$ in the ratio $(1+\delta)$. In a manner identical to that of the helical scan embodiment, the tension $T_6=0$ and the tension $T_7$ has the value $\delta/\beta$. As is known in the art, the tape 64' must wrap the heads 136, 138 in order to provide proper contact for recording and playback in a manner similar to the wrapping of the tape on the helical scan drum. The frictional effects on the tape segment in contact with the heads 136, 138 results in a controlled low value of tension at the heads 136, 138, as previously described for the helical scan case.

In the embodiments described above, three capstans, including two metering capstans, are utilized to effect the advantages provided by the practice of the invention. A simpler, two capstan transport incorporating the zero tension teaching of the invention, but having only a single metering capstan may be configured to realize some, but not all, of the improvements achieved by the preferred embodiments.

Figure 7:
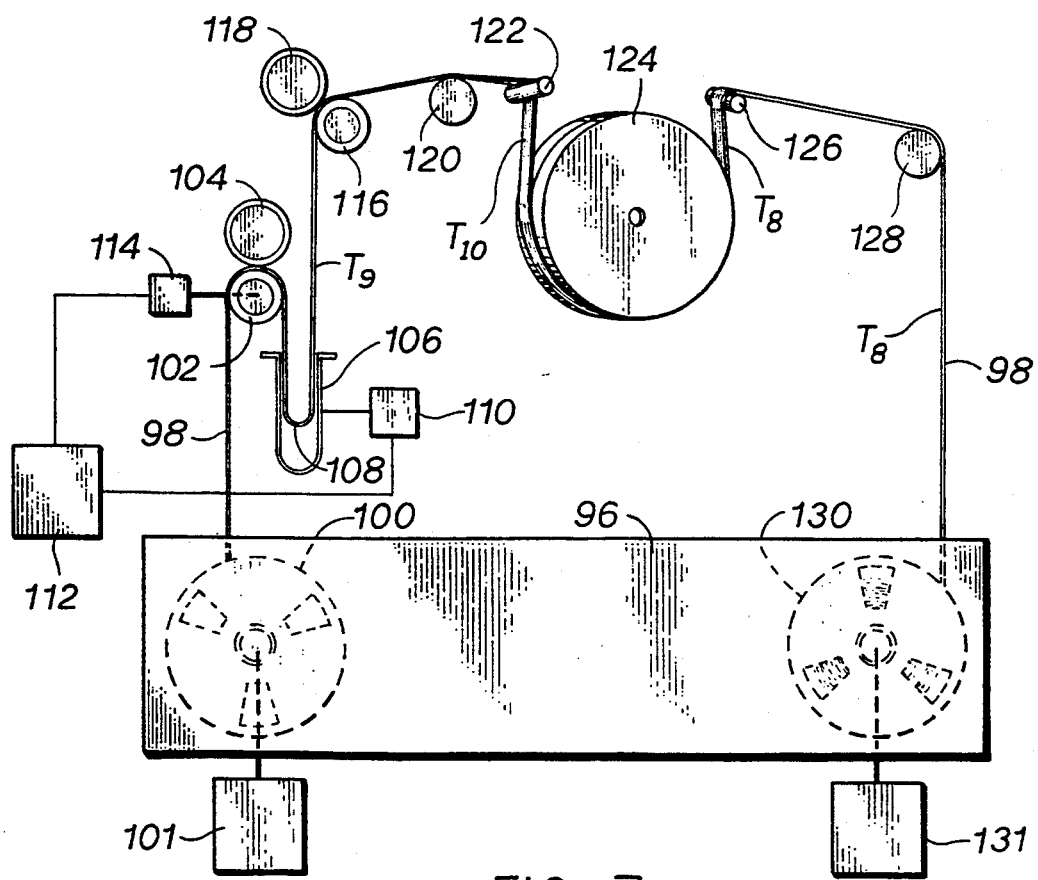
FIG. 7 is a schematic drawing of a helical scan recorder incorporating a two capstan embodiment of the present invention.

Referring to FIG. 7, a two capstan helical scan transport utilizing a cassette 96, feeds tape 98 from a supply reel 100 having a supply motor 101 to a capstan 102 and associated pinch roller 104. The tape 98 exiting the capstan 102 enters a vacuum column 106 where it forms a loop 108. The pressure differential across the tape loop 108 is maintained at a very low value, so that the tension in the tape loop 108 is substantially equal to zero. A sensor 110, responsive to the location of the loop 108 in the column 106, controls the length of the loop 108 by sending an error signal to a servo 112 which drives a motor 114 coupled to the capstan 102. The tape 98 exiting the vacuum column 106 with zero tension then feeds a metering capstan 116 and associated pinch roller 118, which establish the speed of the tape 98 through the tape drive. Downstream of the capstan 116 the tape 98 engages guides 120, 122 and then wraps a helical scan drum 124 with a wrap angle of approximately 180 degrees. The tape 98 is then guided by guides 126, 128 under tension by a take up motor 131 onto a takeup reel 130 in the cassette 96.

Unlike the embodiments described above, the embodiment of FIG. 7 does not have a capstan downstream of the drum 124. The tape 98 is guided from the drum 124 to the take up reel 130 by means of the guides 126, 128. Resultantly, the tension $T_8$ at the output side of the drum 124 is determined by the reeling system and is transmitted by the tape being spooled onto the takeup reel 130 through the guides 126, 128 to the output side of the drum 124. As described above, the tension of the tape 98 emerging from the vacuum column 106 has substantially zero tension, $T_9$. Accordingly, the tension $T_{10}$ is established by the "brake band" equation, $$T_{10} = T_8 e^{-\mu\theta}$$

and $T_8$, the takeup reeling system tension, is attenuated to provide a necessary tension at the input to the drum 124. It will be noted that the variations in the tension $T_8$ are similarly attenuated but are not completely eliminated in the tension $T_{10}$, and some perturbations in tension are present in the tape being recorded or reproduced. Unlike all consumer VCR's that use one capstan on the output side of the scanner, it is a surprising result that superior performance is obtained from deleting that capstan and, if only two capstans are to be used, they should both be placed on the input side of the scanner.

The invention has been described in detail with particular reference to preferred embodiments thereof, but it will be understood that variations and modifications can be effected within the spirit and scope of the invention.

What is claimed is:

1. A tape drive for transporting tape along a tape path in said drive, said tape being supplied from a tape supply for use with said drive, said tape drive comprising:

a) means for pulling said tape from said supply, b) means for providing holdback tension in said tape pulled from said supply, c) means for sensing the tension in a loop of said tape located in said tape path downstream of said means for pulling said tape from said supply, d) first means for metering the speed of said tape located in said tape path downstream from said loop, e) a helical scan drum located downstream from said first means for metering the speed of said tape, said helical scan drum angularly wrapped by said tape contacting said drum, f) second means for metering the speed of said tape, said second means for metering the speed of said tape being located in said tape path downstream from said helical scan drum, and g) control means for controlling said means for pulling tape from said web, said control means responsive to said means for sensing the tension in said loop wherein said tension in said loop is controlled substantially equal to zero.

2. The tape drive of claim 1 wherein said tape supply is contained in a cassette for use with said tape drive.

3. The tape drive of claim 1 wherein said means for pulling tape from said supply is a first capstan assembly of said drive.

4. The tape drive of claim 1 wherein said means for metering the speed of said tape is a second capstan assembly of said drive.

5. The tape drive of claim 1 wherein said means for sensing said tension in said loop comprises a vacuum column containing said loop.

6. The tape drive of claim 1 wherein said means for sensing said tension in said loop comprises a mechanical arm in contact with said loop.

7. A tape drive for transporting tape along a tape path in said drive, said tape supplied by a tape supply for use with said tape drive, said drive comprising:

a) means for pulling said tape from said supply, b) means for providing holdback tension in said tape pulled from said supply, c) means for sensing the tension in a loop of said tape pulled from said supply, said loop being located downstream of said means for pulling said tape from said supply, d) first means for metering the speed of said tape, being located in said tape path downstream from said loop, e) at least one signal transducing element located downstream from said first means for metering the speed of said tape, said signal transducing element positioned along said tape path for contacting said tape, f) second means for metering the speed of said tape, being located in said tape path downstream of said signal transducing element, and g) control means for controlling said means for pulling tape from said supply, said control means responsive to said means for sensing the tension in said loop wherein said tension in said loop is controlled substantially equal to zero.

8. The tape drive of claim 7 wherein said tape supply is contained in a cassette for use with said tape drive.

9. The tape drive of claim 7 wherein said means for pulling tape from said supply is a first capstan assembly of said drive.

10. The tape drive of claim 7 wherein said means for metering the speed of said tape is a second capstan assembly of said drive.

11. The tape drive of claim 7 wherein said means for sensing said tension in said loop comprises a vacuum column containing said loop.

12. The tape drive of claim 7 wherein said means for sensing said tension in said loop comprises a mechanical arm in contact with said loop.

13. A tape drive for transporting tape along a tape path in said drive, said tape supplied by a cooperative tape supply for use with said tape drive, said drive comprising:

a) means for pulling said tape from said supply, b) means for providing holdback tension in said tape pulled from said supply, c) means for sensing the tension in a loop of said tape pulled from said supply, said loop being located downstream of said means for pulling said tape from said supply, d) means for metering the speed of said tape, said means for metering the speed of said tape being located in said tape path downstream from said loop, e) a helical scan drum located downstream from said means for metering the speed of said tape, said helical scan drum angularly wrapped by said tape contacting said drum, f) control means for controlling said means for pulling tape from said supply, said control means responsive to said means for sensing the tension in said loop wherein said tension in said loop is controlled substantially equal to zero.

14. The tape drive of claim 13 wherein said tape supply is contained in a cassette for use with said tape drive.

15. The tape drive of claim 13 wherein said means for pulling tape from said supply is a first capstan assembly of said drive.

16. The tape drive of claim 13 wherein said means for metering the speed of said tape is a second capstan assembly of said drive.

17. The tape drive of claim 13 wherein said means for sensing said tension in said loop comprises a vacuum column containing said loop.

18. The tape drive of claim 13 wherein said means for sensing said tension in said loop comprises a mechanical arm in contact with said loop.

* * * * *